United States Patent
Kura et al.

(10) Patent No.: US 12,073,004 B2
(45) Date of Patent: Aug. 27, 2024

(54) VERIFICATION INFORMATION GENERATING SYSTEM, VERIFICATION INFORMATION GENERATING METHOD, AND VERIFICATION INFORMATION GENERATING PROGRAM

(71) Applicant: NIPPON TELEGRAPH AND TELEPHONE CORPORATION, Tokyo (JP)

(72) Inventors: Tsuneko Kura, Musashino (JP); Seishi Ouchi, Musashino (JP); Takeshi Nakatsuru, Musashino (JP); Kazumi Kinoshita, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 164 days.

(21) Appl. No.: 17/626,504

(22) PCT Filed: Jul. 23, 2019

(86) PCT No.: PCT/JP2019/028922
§ 371 (c)(1),
(2) Date: Jan. 12, 2022

(87) PCT Pub. No.: WO2021/014596
PCT Pub. Date: Jan. 28, 2021

(65) Prior Publication Data
US 2022/0292224 A1    Sep. 15, 2022

(51) Int. Cl.
*G06F 21/64* (2013.01)
(52) U.S. Cl.
CPC ........ *G06F 21/64* (2013.01); *G06F 2221/033* (2013.01)

(58) Field of Classification Search
CPC ........................... G06F 21/64; G06F 2221/033
See application file for complete search history.

(56) References Cited

U.S. PATENT DOCUMENTS

| | | | | |
|---|---|---|---|---|
| 2010/0062844 A1* | 3/2010 | Crowder, Jr. | ......... | G06F 21/575 463/29 |
| 2016/0197912 A1* | 7/2016 | Liverance | ............... | H04L 67/34 726/7 |

(Continued)

FOREIGN PATENT DOCUMENTS

| CN | 106485139 A | * | 3/2017 | ............. G06F 21/51 |
|---|---|---|---|---|
| CN | 111046436 A | * | 4/2020 | ............. G06F 21/64 |

(Continued)

OTHER PUBLICATIONS

Tripwire Japan KK, "Tripwire", Available Online at:https://www.tripwire.co.jp/about/, Retrieved on Jul. 11, 2019, 3 pages including English Translation.

(Continued)

*Primary Examiner* — Sarah Su
(74) *Attorney, Agent, or Firm* — XSENSUS LLP

(57) ABSTRACT

A verification information creation apparatus acquires an installation directory of software from equipment on which the software is installed, and acquires a file path and a hash value of a file whose hash value is acquirable based on types of files stored in the acquired directory. Then, the verification information creation apparatus creates verification information about the software, where the verification information includes the acquired file path and the hash value of the file.

7 Claims, 14 Drawing Sheets

(56) References Cited

U.S. PATENT DOCUMENTS

| | | | |
|---|---|---|---|
| 2016/0365981 A1* | 12/2016 | Medvinsky | G06F 21/57 |
| 2019/0220267 A1* | 7/2019 | Chen | H04L 63/123 |
| 2019/0245680 A1* | 8/2019 | Boutaba | H04L 9/0637 |
| 2020/0328875 A1* | 10/2020 | McMillan | H04L 9/32 |
| 2022/0012230 A1 | 1/2022 | Miyamoto et al. | |
| 2022/0207142 A1* | 6/2022 | Gupta | G06F 21/52 |
| 2022/0269803 A1* | 8/2022 | Kura | G06F 21/64 |
| 2023/0015273 A1* | 1/2023 | Kura | G06F 21/44 |

FOREIGN PATENT DOCUMENTS

| | | |
|---|---|---|
| CN | 114444027 A * | 5/2022 |
| CN | 116340932 A * | 6/2023 |
| EP | 3 855 334 A1 | 7/2021 |
| JP | 2019-8376 A | 1/2019 |
| JP | 2019-8377 A | 1/2019 |
| JP | 2019-8738 A | 1/2019 |
| WO | WO-2022204537 A1 * | 9/2022 |

OTHER PUBLICATIONS

Hata, "Intel TXT Which Enhances the Security of the Virtual Environment", Available Online at:https://tech.nikkeibp.co.jp/it/article/COLUMN/20071114/287197/, Retrieved on Jul. 11, 2019, 9 pages including English Translation.

* cited by examiner

Fig. 2

```
# zipinfo aaa.zip
Archive: aaa.zip
Zip file size: 139215415 bytes, number of entries: 136
drwx----   2.0 fat        0 b-  stor 18-Mar-27 13:54 aaa/Apache_conf/
-rw-a----  2.0 fat      233 t-  defN 18-Mar-09 15:28 aaa/Apache_conf/header-master.conf
-rw-a----  2.0 fat    38319 t-  defN 18-Mar-09 15:28 aaa/Apache_conf/httpd-master.conf
-rw-a----  2.0 fat     1761 b-  defN 18-Mar-09 15:57 aaa/Apache_conf/httpd-proxy-master.conf
-rw-a----  2.0 fat    11082 t-  defN 18-Mar-09 15:28 aaa/Apache_conf/ssl.conf
...
```

FILE FORMAT (t: TEXT FILE; b: BINARY FILE)

Fig. 3

```
# zipinfo bbb.war
Archive:  bbb.war
Zip file size: 98958414 bytes, number of entries: 2658
drwxr-xr-x  2.0 unx        0 b- stor 18-Mar-28 10:21 META-INF/
-rw-r--r--  2.0 unx      130 b- defN 18-Mar-28 10:21 META-INF/MANIFEST.MF
drwxr-xr-x  2.0 unx        0 b- stor 18-Mar-28 10:17 WEB-INF/
drwxr-xr-x  2.0 unx        0 b- stor 18-Mar-28 10:09 WEB-INF/include/
drwxr-xr-x  2.0 unx        0 b- stor 18-Mar-28 10:09 WEB-INF/spring/
```

FILE FORMAT (t: TEXT FILE; b: BINARY FILE)

Fig. 4

| PACKAGE NAME | VERIFICATION INFORMATION ID | FILE PATH/DIRECTORY PATH INFORMATION | HASH VALUE | ESSENTIALITY ATTRIBUTE | CONFIGURATION CHECK REQUIREMENT ATTRIBUTE | ACCESS SOURCE PERMISSION LIST | |
|---|---|---|---|---|---|---|---|
| httpd-2.4.6 | 0001 | /usr/sbin/httpd | 1bf80449... | YES | YES | -- | |
| httpd-2.4.6 | 0001 | /etc/httpd/conf/httpd.conf | -- | YES | YES | /usr/sbin/httpd | |
| tomcat-9.0.4 | 0003 | /opt/tomcat | dag32245... | NO | NO | -- | |
| clamav-0.100 | 0002 | /usr/share/clamav/clamd-gen | 4cd40878... | NO | NO | -- | |
| ... | | | | | | | |

Fig. 5

| PACKAGE NAME | PACKAGE ID | FILE PATH/DIRECTORY PATH INFORMATION | HASH VALUE | ESSENTIALITY ATTRIBUTE | CONFIGURATION CHECK REQUIREMENT ATTRIBUTE | ACCESS SOURCE PERMISSION LIST | USER SIGNATURE | USER-SIGNED PUBLIC-KEY CERTIFICATE | ... |
|---|---|---|---|---|---|---|---|---|---|
| httpd-2.4.6 | httpd-2.4.6.0001.storedevice_id | /usr/sbin/httpd | 1bf80449... | YES | YES | - | M3zDGEX7... | MIICsDCC... | |
| httpd-2.4.6 | httpd-2.4.6.0001.storedevice_id | /etc/httpd/conf/httpd.conf | - | YES | YES | /usr/sbin/httpd | eLX/hu+i... | AZgCAQAw... | |
| tomcat-9.0.4 | tomcat-9.0.4.0003.storedevice_id | /opt/tomcat | dag32245... | NO | NO | - | 7SNw1s+8... | 6AqCs$Jb... | |
| clamav-0.100 | clamav-0.100.0002.storedevice_id | /usr/share/clamav/clamd-gen | 4cd40878... | NO | NO | - | Q/b8FxGT... | azELMAKG... | |
| ... | | | | | | | | | |

Fig. 14

| PACKAGE NAME | PACKAGE ID | VERIFICATION APPARATUS ID | FILE PATH/DIRECTORY PATH INFORMATION | HASH VALUE | CONFIGURATION CHECK REQUIREMENT ATTRIBUTE | ACCESS SOURCE PERMISSION LIST | ... |
|---|---|---|---|---|---|---|---|
| httpd-2.4.6 | httpd-2.4.6.0001.storedevice_id | verif0001 | /usr/sbin/httpd | 1bf80449... | YES | - | |
| httpd-2.4.6 | httpd-2.4.6.0001.storedevice_id | verif0001 | /etc/httpd/conf/httpd.conf | - | YES | /usr/sbin/httpd | |
| tomcat-9.0.4 | tomcat-9.0.4.0003.storedevice_id | verif0001 | /opt/tomcat | dag32245... | NO | - | |
| ... | | | | | | | |

VERIFICATION INFORMATION GENERATING SYSTEM, VERIFICATION INFORMATION GENERATING METHOD, AND VERIFICATION INFORMATION GENERATING PROGRAM

CROSS-REFERENCE TO RELATED APPLICATION

The present application is based on PCT filing PCT/JP2019/028922, filed Jul. 23, 2019, the entire contents of which are incorporated herein by reference.

TECHNICAL FIELD

The present invention relates to a verification information creation system, a verification information creation method, and a verification information creation program.

BACKGROUND ART

Conventionally, in order to verify that there is no security problem with software installed on various equipment (to verify integrity), there have been techniques for detecting any change or falsification of files related to the software (see Non-Patent Literatures 1 and 2). Here, the software is updated as a result of setting changes, application of security patches, or the like. Thus, system operators need to check integrity as appropriate in daily use as well as at the time of software installation.

CITATION LIST

Patent Literature

Patent Literature 1: Japanese Patent Laid-Open No. 2019-8738
Patent Literature 2: Japanese Patent Laid-Open No. 2019-8377

Non-Patent Literature

Non-Patent Literature 1: Tripwire.
Non-Patent Literature 2: "Intel TXT Enhances Security in Virtual Environments," Nikkei XTECH.

SUMMARY OF THE INVENTION

Technical Problem

However, in conventional techniques, there is a problem in that the collation information (verification information) used to check the above-mentioned integrity does not support typical software, which does not necessarily have high reliability because at some time points, the typical software can check only the integrity. Also, there is a problem in that if one attempts to generate verification information that supports typical software while ensuring reliability, human work is increased, requiring time and effort.

Also, there are cases in which various setting information about a software package or information (meta information) about dependencies among various libraries contained in a software package is not described correctly, which may make it necessary to manually set verification information after installation. There is also a problem in that when software is installed without using a software package, because an installation destination is specified by a user, it is also necessary to create verification information reflecting the installation destination. Thus, an object of the present invention is to provide a means of creating verification information that solves the above problems.

Means for Solving the Problem

To achieve the above object, the present invention comprises: a first acquisition section configured to install software to be verified, on equipment, acquires an installation directory of the software from the equipment, identifies a file whose hash value is acquirable, based on types of files stored in the acquired directory, and acquires a file path and a hash value of the file whose hash value is acquirable; and a first verification information creation section configured to create verification information used to verify the software, the verification information including the file path and the hash value of the file, the file path and the hash value being acquired by the first acquisition section.

Effects of the Invention

The present invention can provide a means of creating verification information.

BRIEF DESCRIPTION OF DRAWINGS

FIG. 2 is a diagram illustrating, by example, information obtained by execution of a zipinfo command.
FIG. 3 is a diagram illustrating, by example, information obtained by execution of the zipinfo command.
FIG. 4 is a diagram showing an example of a verification information list.
FIG. 5 is a diagram showing an example of a signed verification information list.
FIG. 14 is a diagram showing an example of a collation information list.

DESCRIPTION OF EMBODIMENTS

Figure 1:
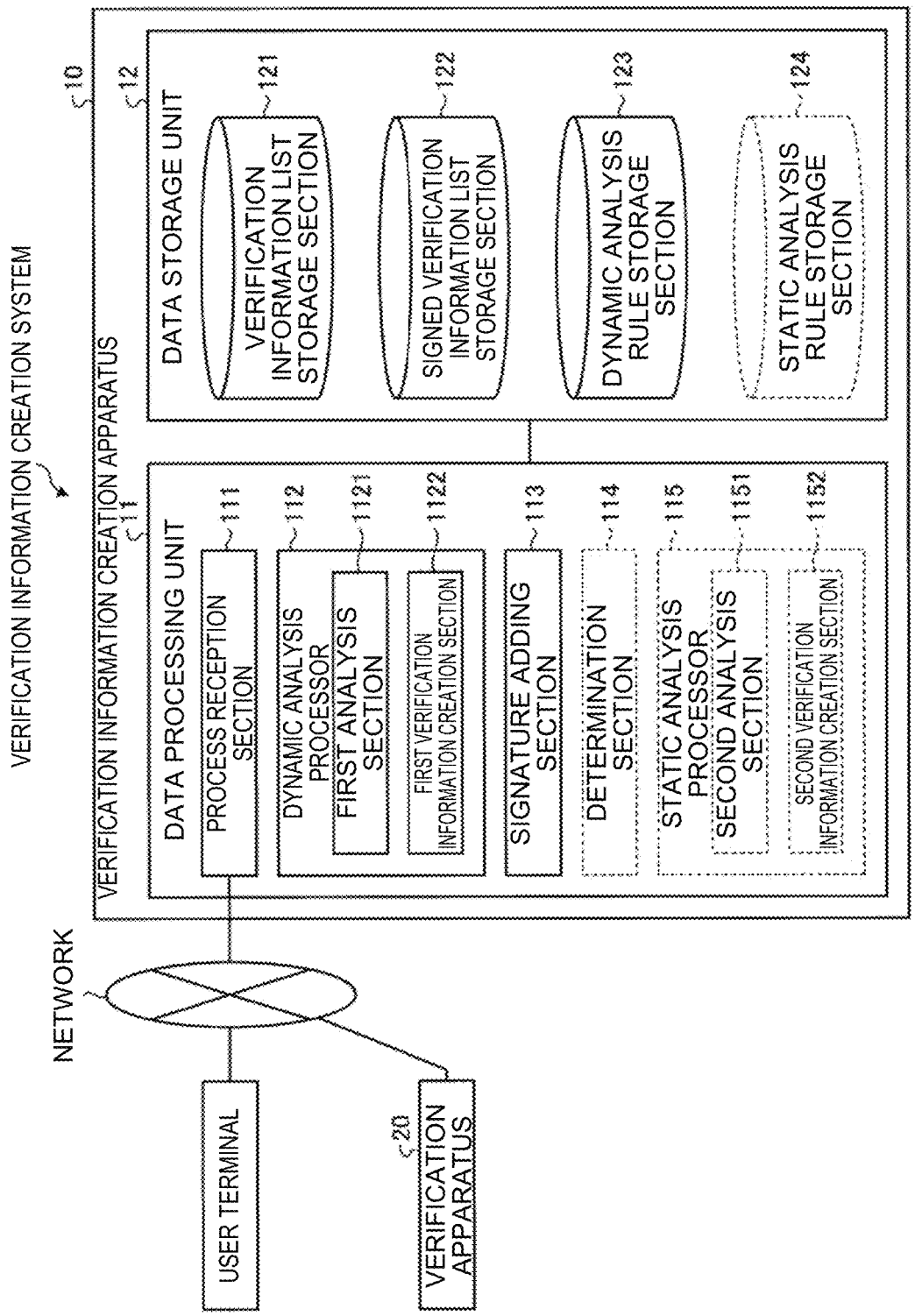
FIG. 1 is a diagram showing a configuration example of a verification information creation system.

Modes for carrying out the present invention (embodiments) will be described below as a first embodiment and a second embodiment with reference to the accompanying drawings. The present invention is not limited to these embodiments. Note that verification information described below serves as a basis for verification of whether or not files related to software installed on equipment have been changed or falsified and verification information modified to suit equipment that verifies whether or not files have actually been changed or falsified is defined as collation information.

[Outline]

Verification information creation apparatuses (verification information creation systems) according to the respective embodiments will be outlined below. For example, to create the verification information described above, the verification information creation apparatus according to each of the embodiments operates software on a verification apparatus on which the software has been installed. Then, the verification information creation apparatus analyzes actual behavior of files and directories when the software is operated, and thereby creates verification information.

For example, when installing the software on a verification apparatus using a tar file in which source files of the software and meta data for installation are bound together into a unity, the user can specify an installation directory. The installation directory and the like specified by the user at the time of installation are saved in config.nice or config.status in a source directory into which the tar file has been extracted. Thus, based on config.nice or config.status in the source directory into which the tar file has been extracted, the verification information creation apparatus identifies an installation directory of the software. Then, the verification information creation apparatus creates verification information using information on files to be stored in the identified installation directory.

For example, based on types of the files to be stored in the identified installation directory, the verification information creation apparatus determines whether each of the files is a real file. Then, the verification information creation apparatus identifies the real file as a file that can take a hash value. Subsequently, the verification information creation apparatus calculates a hash value of the file that can take a hash value, and creates verification information including a file path and the calculated hash value of the file (see FIG. 4).

This allows the verification information creation apparatus to create verification information about a software package, of which a software installation destination is specified by the user or a software package, of which various setting information is changed depending on the installed environment.

Note that in what follows, when the verification information creation apparatus analyzes actual behavior of files and directories during operation of software installed on a verification apparatus in order to create verification information about a software package containing the software, this type of analysis will be referred to as "dynamic analysis," as appropriate.

First Embodiment

[Configuration]

Next, a configuration example of a verification information creation system according to the first embodiment will be described using FIG. 1. The verification information creation system includes, for example, a verification information creation apparatus 10 configured to create verification information about a software package and a verification apparatus 20 configured to perform a verification process of software installed on the verification apparatus 20 itself, using the verification information.

The verification information creation apparatus 10 includes a data processing unit 11 and a data storage unit 12. The verification information creation apparatus 10 is connected to a user terminal via a network such as the Internet.

The data processing unit 11 includes a process reception section 111, a dynamic analysis processor 112, and a signature adding section 113. The data storage unit 12 includes a verification information list storage section 121, a signed verification information list storage section 122, and a dynamic analysis rule storage section 123.

Note that a static analysis processor 115 and a static analysis rule storage section 124 indicated by dashed lines may be or may not be provided on the verification information creation apparatus 10, and a case in which the static analysis processor 115 and the static analysis rule storage section 124 are provided will be described in the second embodiment.

First, components of the data processing unit 11 will be described. The process reception section 111 receives a request to create verification information about a software package from the user terminal and returns results thereon.

The dynamic analysis processor 112 conducts dynamic analysis on software package for which verification information is to be created, and creates the verification information. The dynamic analysis processor 112 includes a first analysis section (first acquisition section) 1121 and a first verification information creation section 1122.

The first analysis section 1121 reads rules for conducting dynamic analysis on the software package for which verification information is to be created, out of the dynamic analysis rule storage section 123. Then, following the read rules, the first analysis section 1121 installs the software package on the verification apparatus 20 and acquires the installation directory of software contained in the software package from the verification apparatus 20. Subsequently, the first analysis section 1121 identifies a file whose hash value is acquirable, based on types of files stored in the acquired directory. Then, the first analysis section 1121 acquires a file path and a hash value of the file whose hash value is acquirable.

For example, the first analysis section 1121 identifies an installation directory of the software based, for example, on config.nice or config.status contained in a tar file. Then, based on types of the files to be stored in the identified installation directory, the first analysis section 1121 determines whether each of the files is a real file.

Then, the first analysis section 1121 identifies the file determined to be a real file as a file that can take a hash value. Subsequently, the first analysis section 1121 calculates the hash value of the file that can take a hash value, and acquires the file path and the calculated hash value of the file.

Also, the first analysis section 1121 acquires a package name and verification information ID (e.g., serial number) of the software package from the tar file.

For example, by executing the following command, the first analysis section 1121 identifies the types of the files to be stored in the installation directory, and calculates the hash value of the file whose hash value is acquirable.

[Math. 1]

```
# file *
anaconda-ks.cfg:   ASCII text
nginx-core__1.10.0-0ubuntu0.16.04.4__amd64.deb:   Debian binary package(format 2.0)
```

-continued

[Math. 1]

```
og:      ASCII text
test.txt:   UTF-8 Unicode text
# find . -type f -exec md5sum { }              \;
f564036eb3c48b65cb535e28d06a01cf               ./anaconda-ks.cfg
1abdb661aad10d5f6590131afe580a2d               ./nginx-core 1.10.0-
0ubuntu0.16.04.4_amd64.deb
3594b394ced3d9c52870116f2a26b780               ./og
6fb76fe20ce0cbf06a468104bd816bb8               ./test.txt
```

Here, for example, if the file from which the hash value can be acquired is a text file, it may become necessary to rewrite the file due to setting changes or the like after installation of the software. Thus, if the file from which the hash value can be acquired is a text file, the first analysis section 1121 recalculates the hash value of the file after software settings on the verification apparatus 20 are changed. Then, the first verification information creation section 1122 rewrites the hash value of the file in the verification information into the recalculated value.

Also, the software package to be analyzed by the first analysis section 1121 may be a compressed file.

The compressed file is, for example, a zip file or a war file. The zip file is in archive format that allows multiple files to be handled by being gathered into a single file. The war file is a package of a JAVA (registered trademark) Platform Enterprise Edition (JAVA EE) application and is compressed in zip format.

Both zip file and war file allow file formats (t: text file; b: binary file) of the files contained in the compressed file to be checked using a zipinfo command (see FIGS. 2 and 3).

Thus, for example, if the file's file format obtained by the zipinfo command is text file, the first analysis section 1121 recalculates the hash value of the file after software settings on the verification apparatus 20 are changed because the file can be rewritten.

The first verification information creation section 1122 creates verification information about a software package based on information acquired by the first analysis section 1121 by analyzing the software package.

For example, the first verification information creation section 1122 creates verification information (see FIG. 4) using the package name and verification information ID (e.g., serial number) of the software package, the file path or directory of the file to be verified, the hash value of the file, and the like acquired by the first analysis section 1121 by analyzing the software package. Subsequently, the first verification information creation section 1122 stores the created verification information in the verification information list storage section 121 and returns a notice to the user terminal, informing the user terminal that verification information has been created.

Note that when instructions to read verification information are received via the user terminal, the process reception section 111 reads the verification information specified by the instructions out of the verification information list storage section 121 and transmits the verification information to the user terminal. Subsequently, upon receiving a modification of the verification information from the user terminal, the process reception section 111 stores verification information that reflects the modification in the verification information list storage section 121.

For example, if the process reception section 111 is instructed by the user terminal to add an access source (executable file path of a program having access permission) permitted by an access source permission list (see FIG. 4) in the verification information to the verification information, the process reception section 111 stores the verification information modified based on the instructions, in the verification information list storage section 121.

Note that the process reception section 111 may store verification information transmitted from an external apparatus (e.g., the user terminal) in the verification information list storage section 121.

The signature adding section 113 adds a public-key certificate signed by the user to the verification information. For example, when the signature adding section 113 receives a request to add a signature to verification information, from the user terminal, the process reception section 111 selects appropriate verification information from the verification information list storage section 121 and passes the verification information to the signature adding section 113. Then, the signature adding section 113 replaces the verification information ID with a package ID (the package name plus the verification information ID plus identification information about the equipment in which the verification information is to be stored), adds a user signature of the equipment in which the verification information is to be stored and the public-key certificate signed by the user to the verification information, and stores the resulting verification information (see FIG. 5) in the signed verification information list storage section 122.

Then, the signature adding section 113 adds the user signature of the verification apparatus 20 on which the software package is to be installed and the public-key certificate signed by the user, to the verification information (see FIG. 5) and stores the verification information in the signed verification information list storage section 122.

Next, components of the data storage unit 12 will be described. The verification information list storage section 121 of the data storage unit 12 stores a list of verification information (a verification information list). For example, as shown in FIG. 4, the verification information includes the package name and verification information ID of the software package, the file path or directory path information about the file to be verified, the hash value of the file, an essentiality attribute, and the like. Also, as shown in FIG. 4, the verification information may include a configuration check requirement attribute, an access source permission list, and the like.

The essentiality attribute provides attribute information as to whether the file indicated by file path/directory path information of the verification information is a required file of the equipment on which the software package is to be installed.

Also, the configuration check requirement attribute provides attribute information as to whether the file indicated by file path/directory path information of the verification information is marked for configuration checking.

Furthermore, the access source permission list provides information that shows an executable file path of a program having access permission, to the file indicated by the file path/directory path information of the verification information.

Information about the essentiality attribute, the configuration check requirement attribute, and the access source permission list is entered, for example, via the user terminal.

The signed verification information list storage section 122 stores a list of signed verification information (see FIG. 5). The list of signed verification information is a list of verification information to which the user signature of the equipment on which the software package is to be installed and a public-key certificate signed by the user have been added. For example, the list of signed verification information (see FIG. 5) is created by replacing the verification information ID with a package ID made up of the package name plus the verification information ID plus identification information about the equipment in which the verification information is to be stored and adding a user signature of the verification apparatus 20 in which the verification information is to be stored and the public-key certificate signed by the user to each piece of the verification information shown in FIG. 4.

For each software package, the dynamic analysis rule storage section 123 stores information (dynamic analysis rules) showing a method of dynamic analysis used to create verification information about the software package.

The dynamic analysis rules are, for example, as follows. That is, when conducting dynamic analysis on a tar file, first, regarding the tar file, the first analysis section 1121 identifies an installation directory of the software based on config.nice or config.status contained in the tar file. Next, based on the types of the files to be stored in the identified installation directory, the first analysis section 1121 determines whether each of the files is a real file. Then, the first analysis section 1121 identifies the file determined to be a real file as a file that can take a hash value and acquires the file path and the hash value of the file.

[Processing Procedures]

Figure 6:
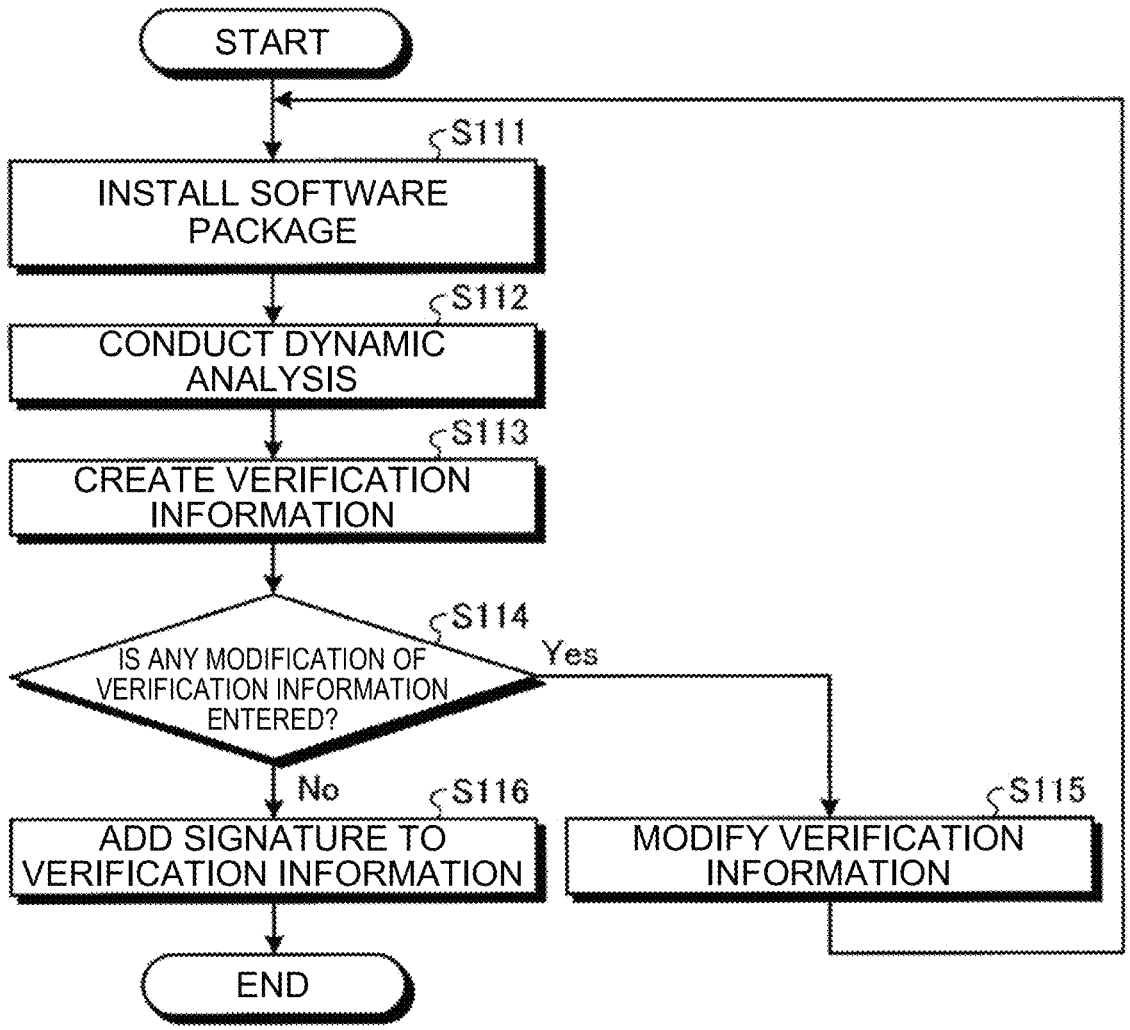
FIG. 6 is a flowchart showing exemplary processing procedures of a verification information creation apparatus according to a first embodiment.

Next, exemplary processing procedures of the verification information creation apparatus 10 will be described using FIG. 6. For example, when an input is received from the user terminal or the like, indicating that verification information about a software package will be created, the verification information creation apparatus 10 performs the following process.

First, the first analysis section 1121 of the verification information creation apparatus 10 installs a software package for which verification information is to be created, on equipment (S111) and conducts dynamic analysis on the software package based on dynamic analysis rules for the software package (S112). Subsequently, the first verification information creation section 1122 creates verification information about the software package based on analysis results on the software package produced by the first analysis section 1121 (S113). Then, the first verification information creation section 1122 stores the verification information created in S113 in the verification information list storage section 121.

Subsequently, if the process reception section 111 receives as input a modification of the verification information from the user terminal or the like (Yes in S114), the process reception section 111 modifies the verification information (S115) and performs S111 and subsequent processes again. On the other hand, if the process reception section 111 does not receive as input a modification of the verification information (No in S114), the signature adding section 113 adds a user signature and a user-signed public-key certificate to the verification information to be stored in the verification information list storage section 121 and stores the verification information in the signed verification information list storage section 122 (S116: add signature to verification information).

Figure 7:
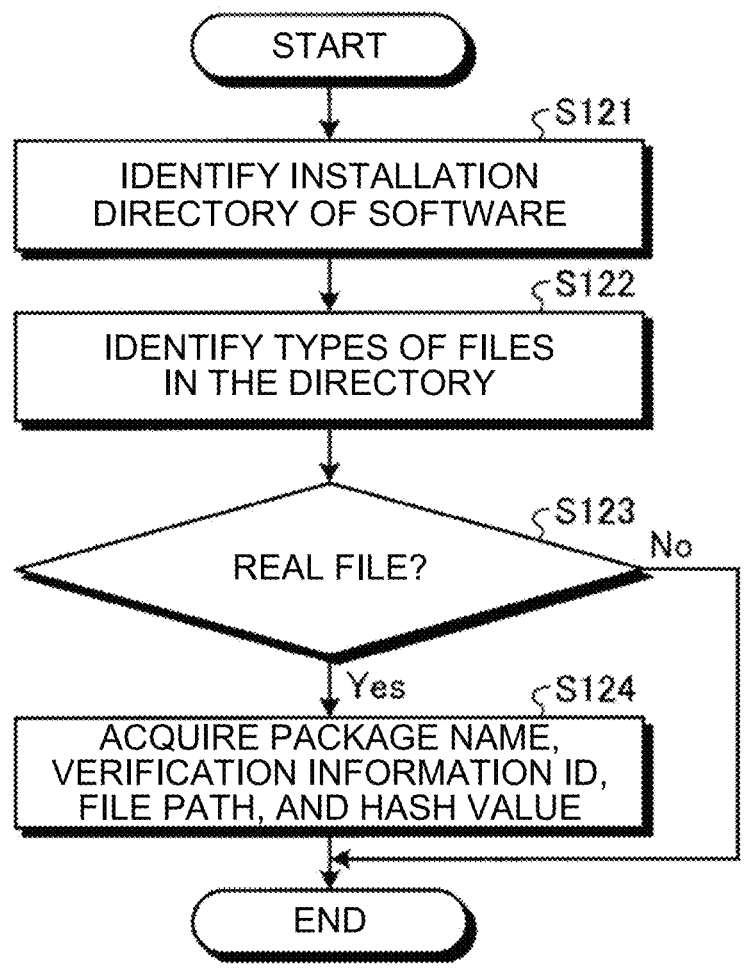
FIG. 7 is a flowchart showing an exemplary analysis process of S112 in FIG. 6.

The analysis process of S112 will be described in detail using FIG. 7. First, the first analysis section 1121 identifies the installation directory of the software contained in the software package based on the dynamic analysis rules for the software package (S121). Subsequently, the first analysis section 1121 identifies the types of files in the directory (S122). Here, regarding the file determined to be a real file (Yes in S123) by the first analysis section 1121 based on the types of files in the directory, the first analysis section 1121 acquires the package name and verification information ID as well as the file path and the hash value of the file from the equipment on which the software contained in the software package will be installed (S124: acquire package name, verification information ID, file path, and hash value). On the other hand, regarding the file determined to be not a real file (No in S123) by the first analysis section 1121 based on the types of files in the directory, the process of S124 is not performed.

This allows the verification information creation apparatus 10 to create verification information about the software package through dynamic analysis of the software package. Note that the verification information creation process described above may be performed when the verification information creation apparatus 10 receives instructions to create verification information about the software package, for example, from the user terminal or the like or receives an input informing that existing verification information has been modified.

[Example of Verification Process]

Figure 8:
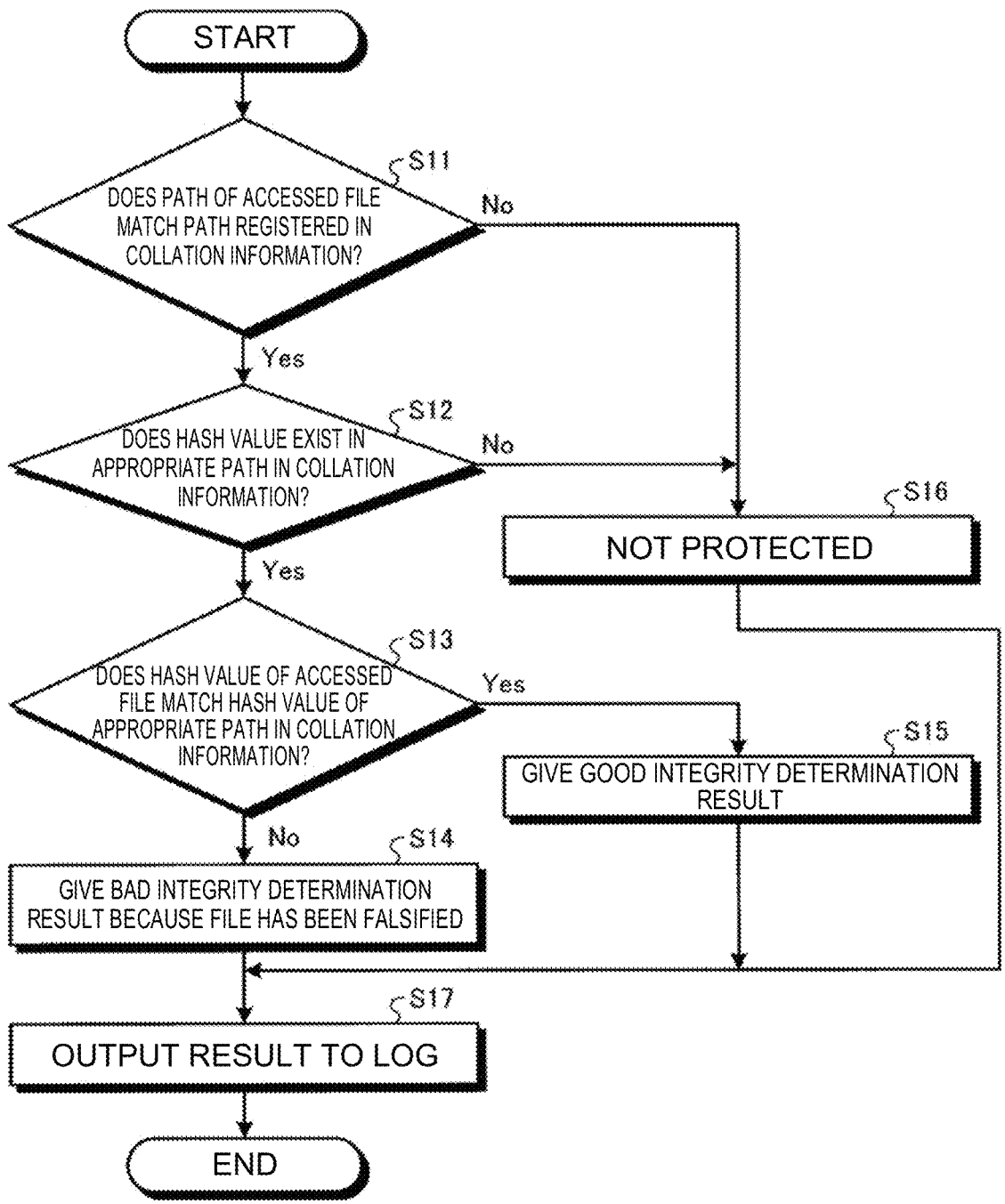
FIG. 8 is a flowchart showing an exemplary verification process using a hash value contained in verification information.

Next, an example of verification process using verification information created by the verification information creation apparatus 10 will be described. For example, the verification apparatus 20 shown in FIG. 1 acquires verification information about the verification apparatus 20 itself from the verification information creation apparatus 10 and performs the verification process shown in FIGS. 8 to 11. First, an example of the verification process using a hash value of verification information will be described with reference to FIG. 8. The verification information created by the verification information creation apparatus 10 is stored in the verification apparatus 20. Based on the user signature and the user-signed public-key certificate, the verification apparatus 20 makes sure that the received verification information has not been falsified. The verification apparatus 20 compares the software installed on the verification apparatus 20 with the verification information and stores the information that fits the verification apparatus 20 as collation information. This information is used later to check files for any change or falsification. For example, in the signed verification information list shown in FIG. 5, the entries in the essentiality attribute of software packages tomcat-9.0.4 and clamav-0.100 are "NO." Here, if it is assumed that tomcat-9.0.4 has been installed, but clamav-0.100 has not been installed, on the verification apparatus 20, information shown in FIG. 14 is saved as collation information. That is, the verification apparatus 20 stores information of the signed verification information list as collation information by removing verification information about software files actually not installed on the verification apparatus 20.

[Verification Process Using Hash Value]

First, upon detecting access to a file in the verification apparatus 20, the verification apparatus 20 determines whether the path of the accessed file matches any path registered in the collation information (S11). Here, if it is determined that the path of the accessed file matches any path registered in the collation information (Yes in S11) and that a hash value exists in the appropriate path in the collation information (Yes in S12), the verification apparatus 20 determines whether the hash value of the accessed file matches the hash value of the appropriate path in the collation information (S13).

If the verification apparatus 20 determines in S13 that the hash value of the accessed file does not match the hash value of the appropriate path in the collation information (No in S13), this means that the file has been falsified, and thus the verification apparatus 20 gives a bad integrity determination result (S14). Then, the verification apparatus 20 outputs the result of determination to a log (S17).

On the other hand, if the verification apparatus 20 determines that the hash value of the accessed file matches the hash value of the appropriate path in the collation information (Yes in S13), the verification apparatus 20 gives a good integrity determination result (not falsified) to the file (S15). Then, the verification apparatus 20 outputs the result of determination to the log (S17).

Note that if it is determined in S11 that the path of the accessed file does not match any path registered in the collation information (No in S11), the verification apparatus 20 determines that the file is not protected (S16) and outputs the result of determination to the log (S17). Also, even if it is determined that a hash value does not exist for the appropriate path in the collation information (No in S12), the verification apparatus 20 determines that the file is not protected (S16) and outputs the result of determination to the log (S17).

[Verification Process for Addition of Unnecessary File]

Figure 9:
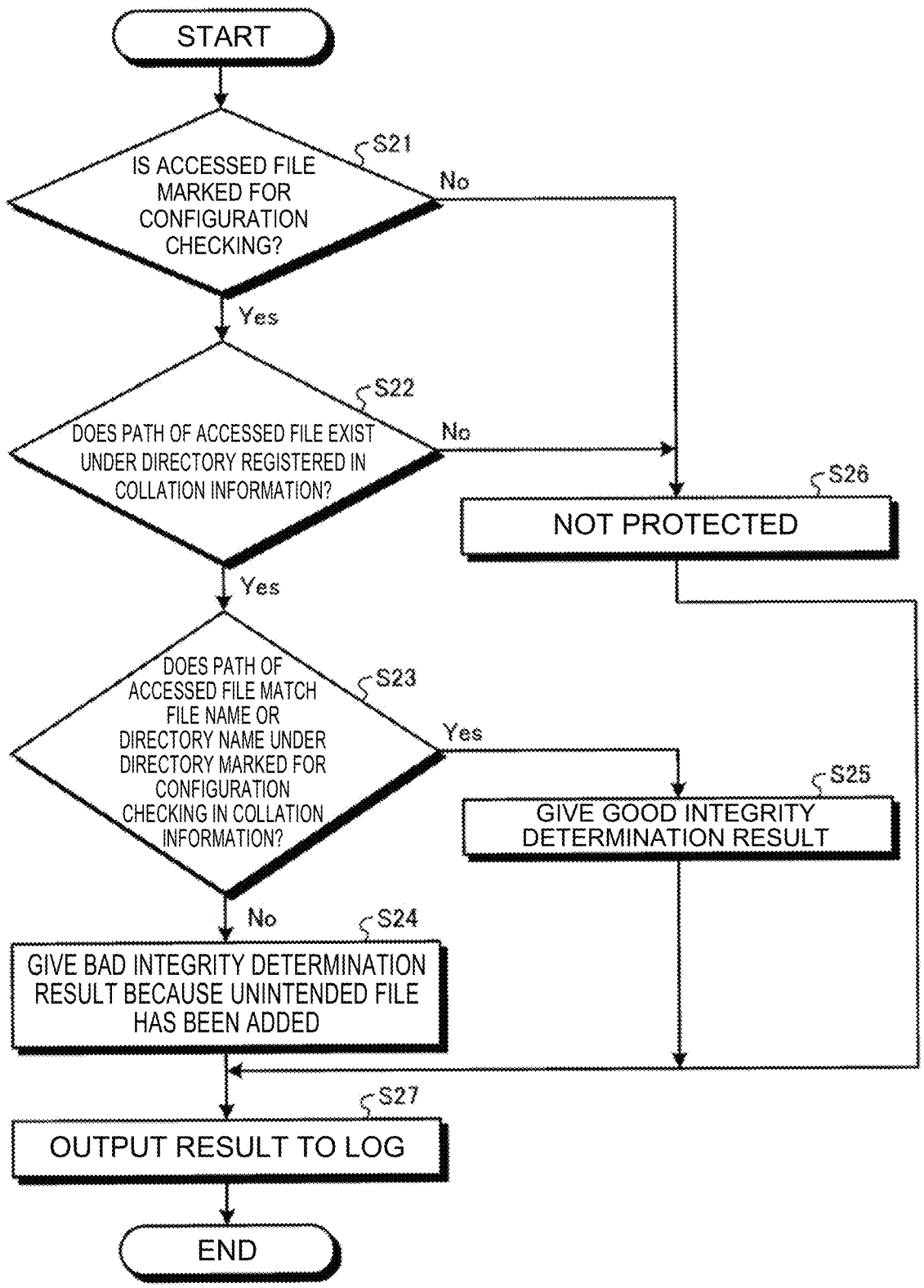
FIG. 9 is a flowchart showing an exemplary verification process for addition of an unnecessary file, where the verification process uses verification information.

Next, an exemplary verification process for addition of an unnecessary file will be described using FIG. 9. First, upon detecting access to a file in the equipment, the verification apparatus 20 determines whether the accessed file is marked for configuration checking in the collation information (S21). Here, if it is determined that the accessed file is marked for configuration checking in the collation information (Yes in S21), the verification apparatus 20 determines whether the path of the accessed file exists under a directory registered in the collation information (S22).

If it is determined in S22 that the path of the accessed file exists under a directory registered in the collation information (Yes in S22), the verification apparatus 20 goes to S23.

If the verification apparatus 20 determines in S23 that the path of the accessed file does not match any file name or directory name just under the directory of the collation information (No in S23), because an unintended file has been added, the verification apparatus 20 gives a bad integrity determination result (S24). Then, the verification apparatus 20 outputs the result of determination to the log (S27).

On the other hand, if the verification apparatus 20 determines that the path of the accessed file match any file name or directory name just under the directory registered in the collation information and marked for configuration checking (Yes in S23), the verification apparatus 20 gives a good integrity determination result (no unnecessary file has been added) to the file (S25). Then, the verification apparatus 20 outputs the result of determination to the log (S27).

Note that in S21, if the file, to which access is detected by the verification apparatus 20 is not marked for configuration checking in the collation information (No in S21), the verification apparatus 20 determines that the file is not protected (S26) and outputs the result of determination to the log (S27).

Also, if the verification apparatus 20 determines in S22 that the path of the accessed file does not exist under the directory registered in the collation information and marked for configuration checking (No in S22), the verification apparatus 20 determines that the file is not protected (S26) and outputs the result of determination to the log (S27).

[Verification Process for Deletion of a Mandatory File]

Figure 10:
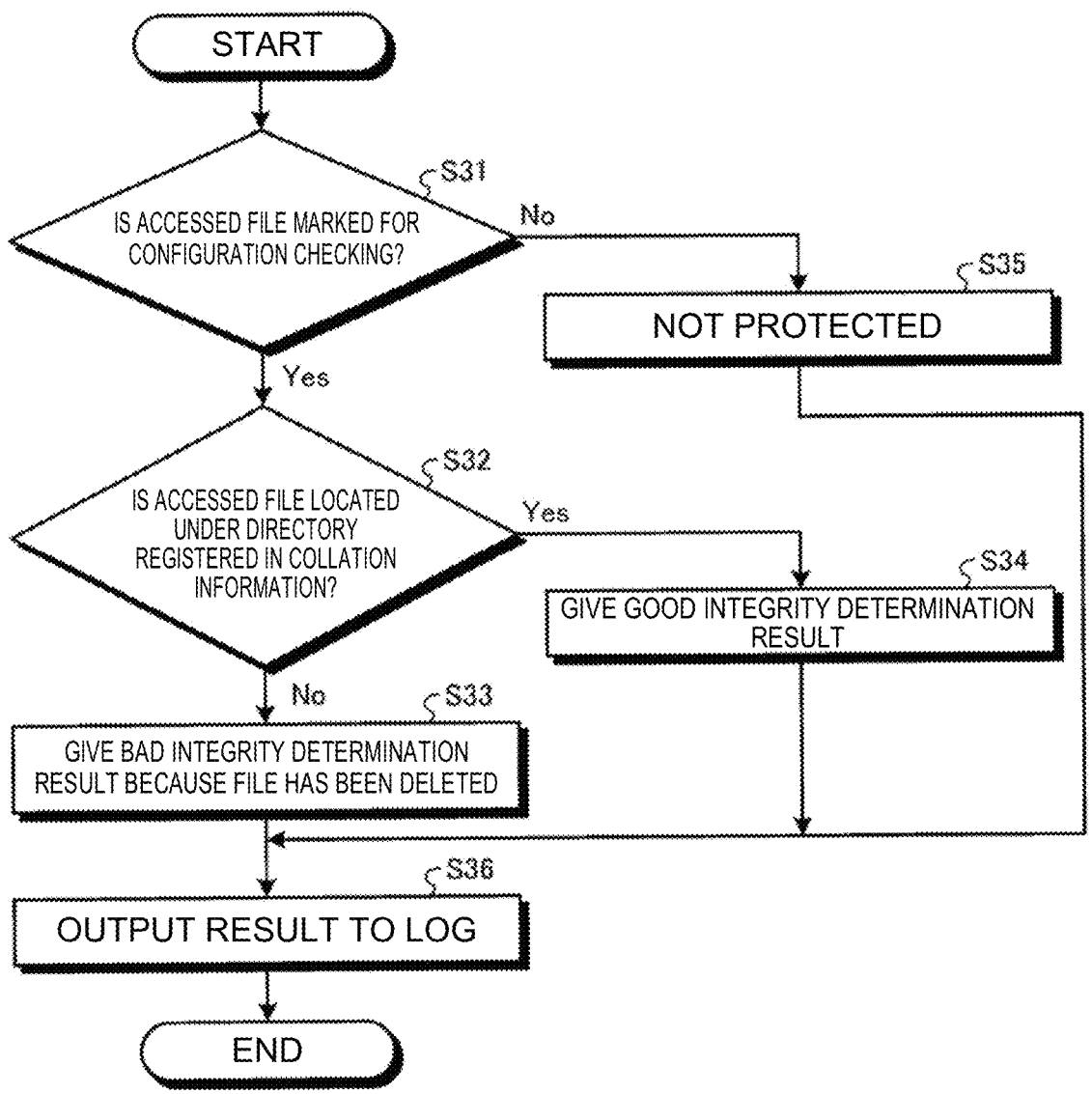
FIG. 10 is a flowchart showing an exemplary verification process for deletion of a mandatory file, where the verification process uses verification information.

Next, an exemplary verification process for deletion of a mandatory file will be described using FIG. 10. First, upon detecting access to a file in the equipment, if the accessed file is marked for configuration checking in the collation information (Yes in S31), the verification apparatus 20 determines whether the accessed file is located under a directory registered in the collation information (S32).

If it is determined in S32 that the accessed file is located under a directory registered in the collation information (Yes in S32), the verification apparatus 20 gives a good integrity determination result (the file has not been deleted) to the file (S34). Then, the verification apparatus 20 outputs the result of determination to the log (S36).

On the other hand, if it is determined that the accessed file is not located under a directory registered in the collation information (No in S32), the verification apparatus 20 gives a bad integrity determination result because the file has been deleted (S33). Then, the verification apparatus 20 outputs the result of determination to the log (S36).

Note that in S31, even if the path of the file, to which access is detected by the verification apparatus 20 is not marked for configuration checking (No in S31), the verification apparatus 20 determines that the file is not protected (S35) and outputs the result of determination to the log (S36).

[Access-Source Verification Process]

Figure 11:
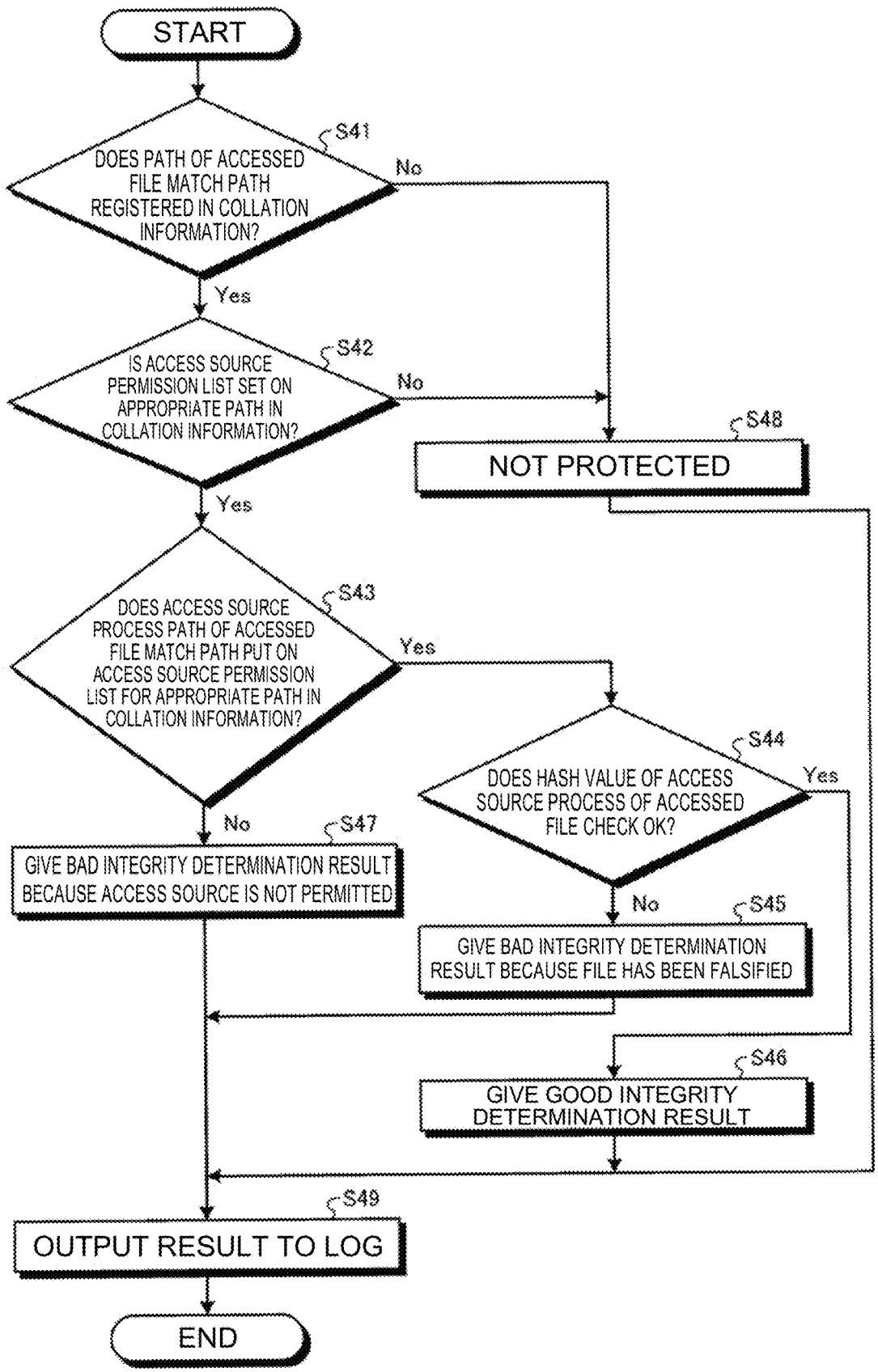
FIG. 11 is a flowchart showing an exemplary access-source verification process that uses verification information.

Next, an exemplary access-source verification process will be described using FIG. 11. First, upon detecting access to a file in the equipment, if it is determined that the path of the accessed file matches any path registered in the collation information (Yes in S41), the verification apparatus 20 determines whether an access source permission list is set on the appropriate path in the collation information (S42).

If it is determined in S42 that an access source permission list for the accessed file is set on the appropriate path in the collation information (Yes in S42), the verification apparatus 20 determines whether an access source process path of the accessed file matches a path put on the access source permission list for the appropriate path in the collation information (S43).

If it is determined in S43 that the access source process path of the accessed file does not match the path put on the access source permission list for the appropriate path in the collation information (No in S43), the verification apparatus 20 gives a bad integrity determination result because the access source is not permitted (S47). Then, the verification apparatus 20 outputs the result of determination to the log (S49).

On the other hand, if it is determined in S43 that the access source process path of the accessed file matches the path put on the access source permission list for the appropriate path in the collation information (Yes in S43), the verification apparatus 20 checks the hash value of the access source process of the accessed file (S44). Then, if the hash value of the access source process of the accessed file does not check OK (No in S44), the verification apparatus 20 gives a bad integrity determination result because the file has been falsified (S45). Then, the verification apparatus 20 outputs the result of determination to the log (S49).

On the other hand, if the hash value of the access source process of the accessed file checks OK in S44 (Yes in S44), the verification apparatus 20 gives a good integrity determination result to the file (S46). Then, the verification apparatus 20 outputs the result of determination to the log (S49).

Note that in S41, if the file, to which access is detected by the verification apparatus 20 does not match any path registered in the collation information (No in S41), the verification apparatus 20 determines that the file is not protected (S48) and outputs the result of determination to the log (S49).

Also, even if the verification apparatus 20 determines in S42 that an access source permission list for the accessed file is not set on the appropriate path in the collation information (No in S42), the verification apparatus 20 determines that the file is not protected (S48) and outputs the result of determination to the log (S49).

This allows the verification apparatus 20 to perform various verification processes using the collation information modified to suit the software files installed on the verification apparatus 20, based on the verification information created by the verification information creation apparatus 10.

Note that the verification processes may be performed, for example, by the verification information creation apparatus 10.

Second Embodiment

Some software packages have their software installation directories specified in advance. For example, with rpm packages and deb packages of Linux (registered trademark), installation directories have been specified in advance. Thus, regarding the rpm packages, deb packages, and the like, even if the packages are not installed on the equipment, by analyzing the software packages themselves, the verification information creation apparatus 10 can identify the installation destinations of the software. Analysis of software packages such as described above will be referred to hereinafter as static analysis.

Note that the rpm package is a system developed by Red Hat Inc. and used to manage software packages. The deb packages, examples of which include Debian and Ubuntu, are binary packages used by Linux (registered trademark).

For example, the rpm package can acquire various information by executing rpm commands as shown below after settings are completed.

[Math. 2]

```
# rpm -q --
qf'[%{name},%{filenames},%{filemodes:octal},%{fileflags::
fflags,%{filedigests},%{fileverifyflags:hex}\n] "
    name          package name
    filenames     names of files included in the
package
    filemodes     modes of files (file types +
permission)
        file types           d: directory / c: character
device / s: socket / -: file
        permission           r: file or directory is
readable / w: file or directory is writable / x: file is
executable
    fileflags     whether the file is a document, or a
config file and a flagged file
    filedigests hash value (MD5)
    fileverifyflags          numeric values of verification
flags for respective files
```

That is, by executing the rpm command, the verification information creation apparatus 10 can acquire the package name; the names of files included in the package; file modes; file types (d: directory/c: character device/s: socket/-: file); permission (r: file or directory is readable/w: file or directory is writable/x: file is executable); whether the file is a document, or a config file and a flagged file; hash value (MD5); and numeric values of verification flags for respective files and the like from the rpm package.

By executing the rpm command, for example, with respect to an rpm package, the verification information creation apparatus 10 can acquire each piece of the information described above.

Here, of the files contained in the package, it can be considered that the files subject to hash checking at the time of file verification are binary files that do not undergo file rewriting. Thus, the verification information creation apparatus uses, as verification information, a file that gives a value of 1 when the value (0x********) of %{fileverifyflags:hex} described above is logically ANDed with 0x00000001.

Also, of the files contained in the package, it can be considered that no change will be made to a write-protected config file once settings are made. Thus, with reference to the value of %{fileflags}, the verification information creation apparatus also uses a write-protected config file as verification information.

By performing the above process, the verification information creation apparatus 10 creates, for example, the verification information shown in FIG. 4. That is, the verification information creation apparatus 10 creates verification information including the package name and verification information ID of the software package for which verification information is to be created, information on the file path or directory path of the file to be verified on the given equipment, the hash value and essentiality attribute of the file, and the like, for example, shown in FIG. 4.

Note that in the case of a deb package the file path and hash value (MD5) of each file included in each package can be acquired using the following command after installation. Thus, the verification information creation apparatus can use verification information acquired by the following command.

dlocate--md5sum package name

Thus, if verification information can be created by static analysis of the software package for which verification information is to be created, the verification information creation apparatus 10 creates the verification information by static analysis. If a software package does not allow verification information to be created by static analysis, the verification information creation apparatus 10 may create verification information by dynamic analysis. The verification information creation apparatus 10 described above will be described as a verification information creation apparatus 10 according to the second embodiment. The same components as those in the first embodiment will be denoted by the same reference numerals as the corresponding components in the first embodiment, and description thereof will be omitted.

The verification information creation apparatus 10 according to the second embodiment further includes a determination section 114, a static analysis processor 115, and a static analysis rule storage section 124 indicated by dashed lines in FIG. 1.

The determination section 114 determines whether the software package for which verification information is to be created is subject to static analysis. For example, if the software package for which verification information is to be created is an rpm package or a deb package, the determination section 114 determines that the software package is subject to static analysis. On the other hand, if the software package for which verification information is to be created is neither an rpm package nor a deb package, the determination section 114 determines that the software package is subject to dynamic analysis.

The static analysis processor 115 conducts static analysis on the software package and creates verification information using analysis results produced consequently. The static analysis processor 115 includes a second analysis section (second acquisition section) 1151 and a second verification information creation section 1152.

The second analysis section 1151 reads rules for conducting static analysis on the software package for which verification information is to be created, out of the static analysis rule storage section 124. Then, following the read rules, the second analysis section 1151 acquires information about files unlikely to be changed in daily use from the files contained in the software package.

For example, by executing a predetermined command, the second analysis section 1151 acquires the file path and the hash value of the file (e.g., a binary file) to be checked using the hash value during verification as well as the file path of a non-rewritable config file, out of the files contained in the software. Also, the second analysis section 1151 acquires the package name and verification information ID (e.g., serial number) of the software package.

Based on information acquired as a result of analysis conducted on the software package by the second analysis section 1151, the second verification information creation section 1152 creates verification information about the software package. For example, based on information acquired as a result of static analysis conducted on the software package by the second analysis section 1151, the second verification information creation section 1152 creates verification information (see FIG. 4) indicating the package name and verification information ID of the software package, information on the file path or directory path of the file to be verified, the hash value and essentiality attribute of the file, and the like. Subsequently, the second verification information creation section 1152 stores the created verification information in the verification information list storage section 121 and returns a notice to the user terminal, informing the user terminal that verification information has been created.

For each software package, the static analysis rule storage section 124 stores information (static analysis rules) indicating how to conduct static analysis on the software package. For example, the static analysis rules execute an rpm command for an rpm package, acquire information about binary files that undergo a hash check at the time of file verification, and acquire information about a write-protected config file.

[Processing Procedures]

Figure 12:
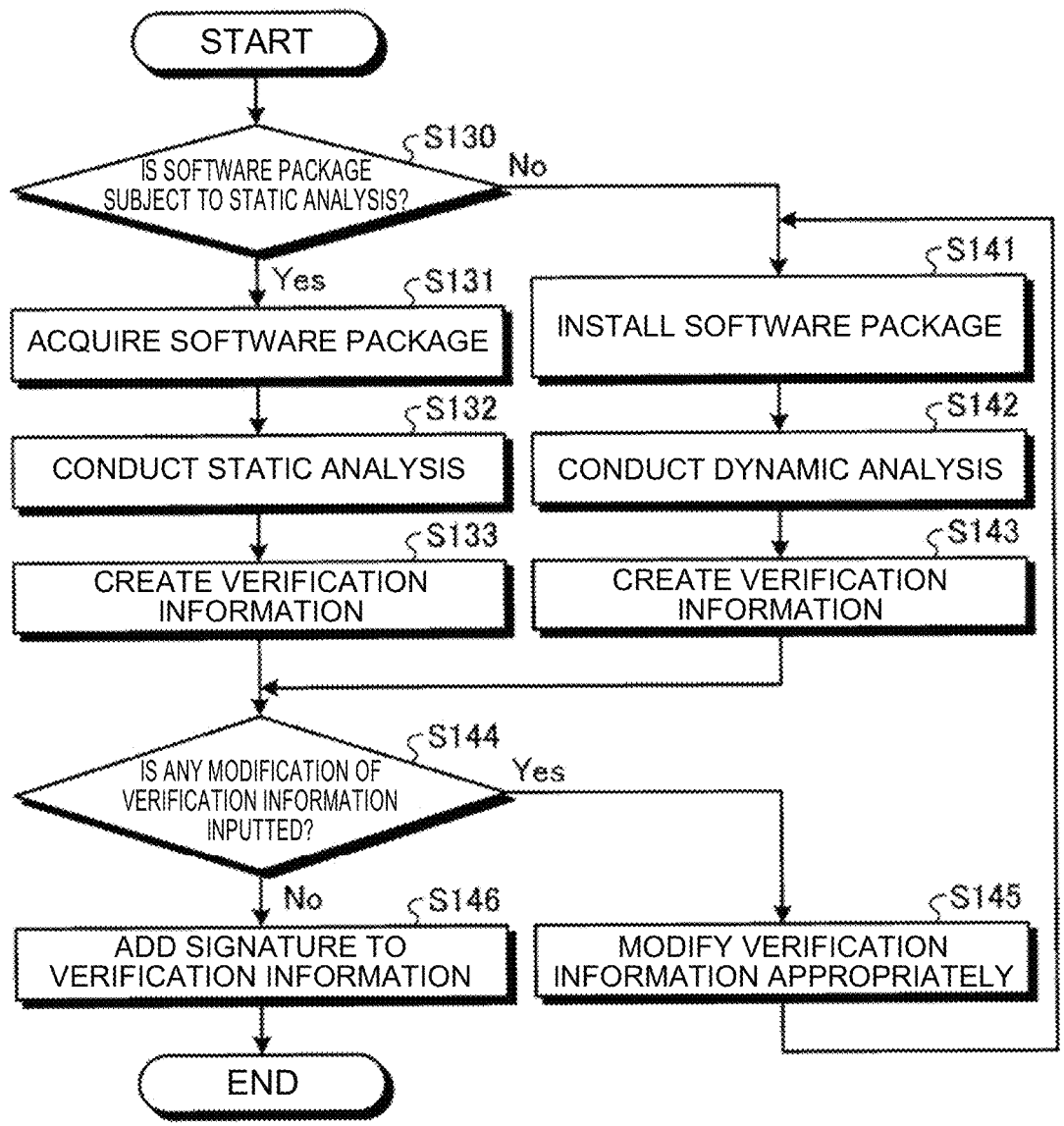
FIG. 12 is a flowchart showing exemplary processing procedures of a verification information creation apparatus according to a second embodiment.

Next, exemplary processing procedures of the verification information creation apparatus 10 according to the second embodiment will be described using FIG. 12. For example, when an input is received from the user terminal or the like, indicating that verification information about a software package will be created, the verification information creation apparatus 10 performs the following process.

First, the determination section 114 of the verification information creation apparatus 10 determines whether the software package for which verification information is to be created is packaged software subject to static analysis (S130). Here, if the determination section 114 determines that the software package for which verification information is to be created is packaged software subject to static analysis (Yes in S130), the verification information creation apparatus 10 acquires the software package (S131). Then, based on the static analysis rules for the software package, the second analysis section 1151 conducts analysis on the software package (S132).

Subsequently, the second verification information creation section 1152 creates verification information about the software package based on analysis results on the software package produced by the second analysis section 1151 (S133). Then, the second verification information creation section 1152 stores the verification information created in S133 in the verification information list storage section 121. Subsequently, if the process reception section 111 receives as input a modification of the verification information (Yes in S144), the process reception section 111 modifies the content of the verification information appropriately (S145) and goes to S141.

On the other hand, if the process reception section 111 does not receive as input a modification of the verification information in S144 (No in S144), the signature adding section 113 adds a user signature and a user-signed public-key certificate to the verification information to be stored in the verification information list storage section 121 and stores the verification information in the signed verification information list storage section 122 (S146: add signature to verification information).

If the determination section 114 determines in S130 that the software package for which verification information is to be created is not packaged software subject to static analysis (No in S130), the verification information creation apparatus 10 installs the software package for which verification information is to be created, on equipment (S141). Then, the first analysis section 1121 conducts dynamic analysis on the software package based on dynamic analysis rules for the software package (S142). Subsequently, the first verification information creation section 1122 creates verification information about the software package based on analysis results on the software package produced by the first analysis section 1121 (S143). Then, the first verification information creation section 1122 goes to S144.

This allows the verification information creation apparatus 10 to create verification information using static analysis for software packages for which verification information can be created by static analysis.

Subsequently, for example, the verification apparatus 20 performs a verification process of the software package as with the first embodiment using the verification information described above.

[Program]

Also, a program that implements functions of the verification information creation apparatus 10 described according to the embodiments can be implemented by being installed on a desired information processing apparatus (computer). For example, by being caused to execute the above program provided as packaged software or online software, the information processing apparatus can be made to function as the verification information creation apparatus 10. What is referred to as information processing apparatus herein may be a desktop computer, a laptop personal computer, a rack-mounted server computer, or the like. Besides, mobile communications terminals such as a smartphone, a cellphone, and a PHS (Personal Handyphone System) as well as a PDA (Personal Digital Assistant) are included in the category of the information processing apparatus. Also, the verification information creation apparatus 10 may be implemented on a cloud server.

Figure 13:
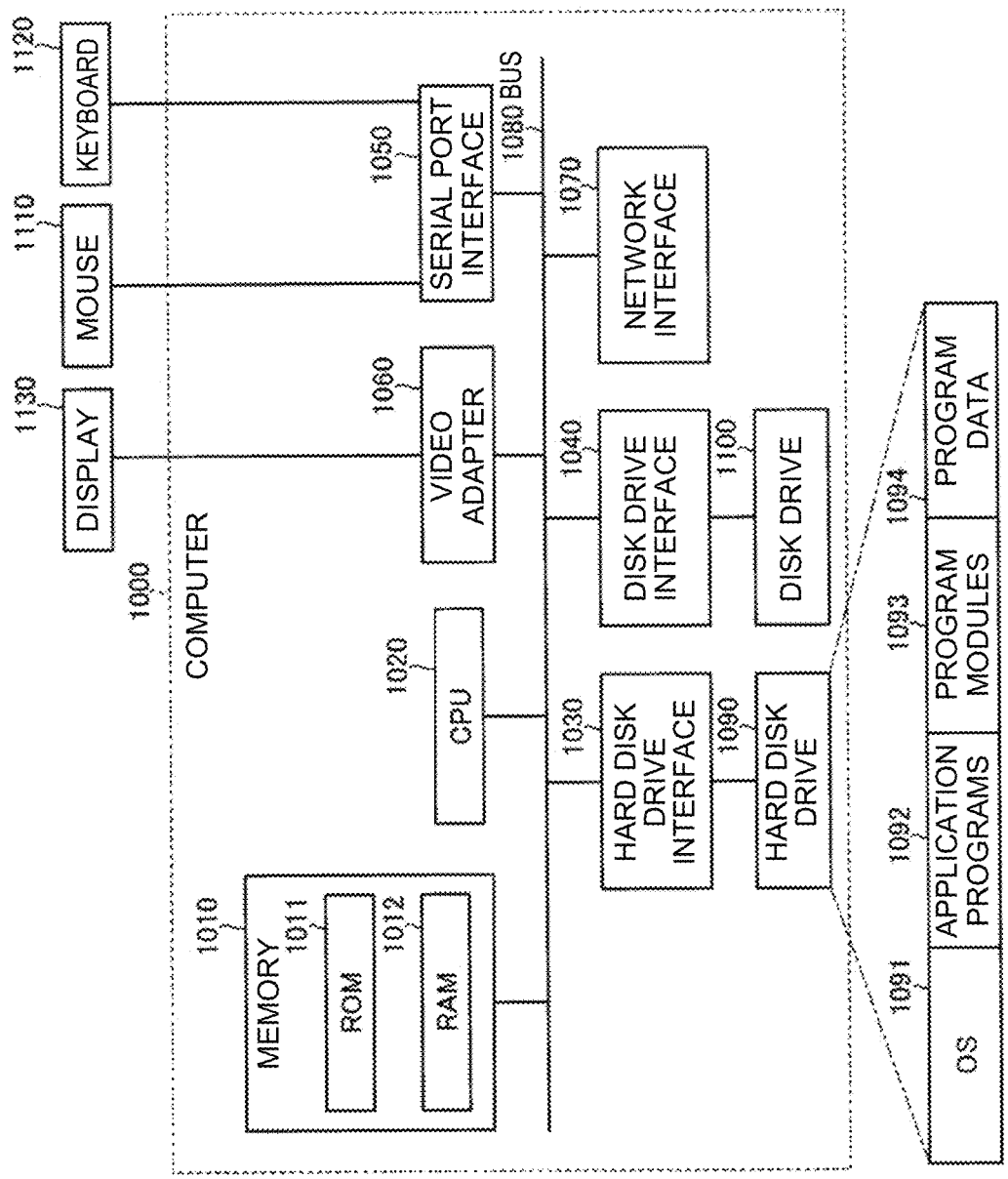
FIG. 13 is a diagram showing an example of a computer that executes verification information creation program.

An example of a computer that executes the above program (verification information creation program) will be described using FIG. 13. As shown in FIG. 13, a computer 1000 includes, for example, a memory 1010, a CPU 1020, a hard disk drive interface 1030, a disk drive interface 1040, a serial port interface 1050, a video adapter 1060, and a network interface 1070. These components are interconnected via a bus 1080.

The memory 1010 includes a ROM (Read Only Memory) 1011 and a RAM (Random Access Memory) 1012. The ROM 1011 stores, for example, a boot program such as a BIOS (Basic Input Output System). The hard disk drive interface 1030 is connected to a hard disk drive 1090. The disk drive interface 1040 is connected to a disk drive 1100. For example, a removable storage medium such as a magnetic disk or an optical disk is inserted into the disk drive 1100. The serial port interface 1050 is connected, for example, with a mouse 1110 and a keyboard 1120. The video adapter 1060 is connected, for example, with a display 1130.

Here, as shown in FIG. 13, the hard disk drive 1090 stores, for example, an OS 1091, application programs 1092, program modules 1093, and program data 1094. The data storage unit described in the above embodiments is provided, for example, in the hard disk drive 1090 or the memory 1010.

Then, the CPU 1020 loads the program modules 1093 or the program data 1094 into RAM 1012 as required from the hard disk drive 1090 and carries out the above procedures.

Note that the program modules 1093 and program data 1094 related to the verification information creation program may not only be stored in the hard disk drive 1090, but also be stored, for example, in a removable storage medium and be read by the CPU 1020 via the disk drive 1100 or the like. Alternatively, the program modules 1093 and program data 1094 related to the verification information creation program may be stored in another computer connected via a network such as a LAN or a WAN (Wide Area Network), and be read by the CPU 1020 via the network interface 1070.

REFERENCE SIGNS LIST

10 Verification information creation apparatus
20 Verification apparatus
11 Data processing unit
12 Data storage unit
111 Process reception section
112 Dynamic analysis processor
113 Signature adding section
114 Determination section
115 Static analysis processor
121 Verification information list storage section
122 Signed verification information list storage section
123 Dynamic analysis rule storage section
124 Static analysis rule storage section
1121 First analysis section
1122 First verification information creation section
1151 Second analysis section
1152 Second verification information creation section

The invention claimed is:

1. A verification information creation system comprising:
a memory; and
a processor coupled to the memory and configured to:
install software to be verified, on equipment, acquire an installation directory of the software from the equipment, identify a file whose hash value is acquirable, based on types of files stored in the acquired directory, and acquire a file path and a hash value of the file whose hash value is acquirable; and
create verification information used to verify the software, the verification information including the file path and the hash value of the file, the file path and the hash value being acquired by the processor,
wherein the processor is further configured to:
determine whether the software to be verified is contained in an rpm package or a deb package;
acquire a file path and a hash value of a file to be checked using the hash value during verification of the file out of files contained in the software package by executing a predetermined command for the software package of the software if it is determined that the software to be verified is contained in an rpm package or a deb package; and
create verification information about the software package, the verification information including the file path and the hash value of the file acquired by the processor.

2. The verification information creation system according to claim 1, wherein
when the file whose hash value is acquirable is a text file, the hash value of the text file after settings of the software on the equipment are changed is acquired.

3. The verification information creation system according to claim 1, wherein
when the software is installed using a tar file, an installation directory is acquired, the installation directory being of the software from config.nice or config.status saved in a directory into which the tar file is extracted on the equipment.

4. The verification information creation system according to claim 1, wherein:
if the verification information is changed after being created, the processor installs the software on the equipment again and acquires a file path and a hash value of the file whose hash value is acquirable; and
the processor creates verification information about the software, the verification information including the file path and the hash value of the file, the file path and the hash value being acquired by the processor.

5. The verification information creation system according to claim 1, wherein the processor is further configured to:
add a user signature of a user of the equipment on which the software is installed and a public-key certificate of the user to the verification information.

6. A verification information creation method performed by a verification information creation system, the method comprising:
installing software to be verified, on equipment, acquiring an installation directory of the software from the equipment, identifying a file whose hash value is acquirable, based on types of files stored in the acquired directory, and acquiring a file path and a hash value of the file whose hash value is acquirable; and
creating verification information used to verify the software, the verification information including the acquired file path and the hash value of the file,
wherein the method further includes:
determining whether the software to be verified is contained in an rpm package or a deb package;
acquiring a file path and a hash value of a file to be checked using the hash value during verification of the file out of files contained in the software package by executing a predetermined command for the software package of the software if it is determined that the software to be verified is contained in an rpm package or a deb package; and creating verification information about the software package, the verification information including the file path and the hash value of the file acquired.

7. A non-transitory computer readable storage medium having stored therein a verification information creation program that causes a computer to execute a process comprising:

installing software to be verified, on equipment, acquiring an installation directory of the software from the equipment, identifying a file whose hash value is acquirable, based on types of files stored in the acquired directory, and acquiring a file path and a hash value of the file whose hash value is acquirable; and creating verification information used to verify the software, the verification information including the acquired file path and the hash value of the file, wherein the process further includes:

determining whether the software to be verified is contained in an rpm package or a deb package;

acquiring a file path and a hash value of a file to be checked using the hash value during verification of the file out of files contained in the software package by executing a predetermined command for the software package of the software if it is determined that the software to be verified is contained in an rpm package or a deb package; and creating verification information about the software package, the verification information including the file path and the hash value of the file acquired.

* * * * *